United States Patent
Chen

(10) Patent No.: US 10,063,484 B2
(45) Date of Patent: Aug. 28, 2018

(54) METHOD, DEVICE, AND SYSTEM FOR ESTABLISHING TRAFFIC ENGINEERING LABEL SWITCHED PATH

(71) Applicant: HUAWEI TECHNOLOGIES CO., LTD., Shenzhen (CN)

(72) Inventor: Guoyi Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 150 days.

(21) Appl. No.: 14/980,626

(22) Filed: Dec. 28, 2015

(65) Prior Publication Data

US 2016/0134547 A1 May 12, 2016

Related U.S. Application Data

(63) Continuation of application No. PCT/CN2014/081064, filed on Jun. 28, 2014.

(30) Foreign Application Priority Data

Jun. 28, 2013 (CN) .......................... 2013 1 0270622

(51) Int. Cl.
*G01R 31/08* (2006.01)
*H04L 12/815* (2013.01)
(Continued)

(52) U.S. Cl.
CPC .......... *H04L 47/22* (2013.01); *H04L 12/4641* (2013.01); *H04L 45/50* (2013.01);
(Continued)

(58) Field of Classification Search
CPC .............................. H04L 12/28; H04L 45/02
(Continued)

(56) References Cited

U.S. PATENT DOCUMENTS

2008/0225706 A1* 9/2008 Lange .................... H04L 41/12
370/230
2010/0165884 A1 7/2010 Farkas et al.
(Continued)

FOREIGN PATENT DOCUMENTS

CN 101436952 5/2009
CN 101800700 8/2010
(Continued)

OTHER PUBLICATIONS

Extended European Search Report dated Apr. 14, 2016 in corresponding European Patent Application No. 14818509.3.
(Continued)

*Primary Examiner* — Iqbal Zaidi
(74) *Attorney, Agent, or Firm* — Staas & Halsey LLP

(57) ABSTRACT

A method, a device, and a system establish a traffic engineering label switched path, which can implement effective isolation between tenants or between services, to ensure security of tenant topology information or service topology information. The method includes: receiving, by an egress node, a resource reservation protocol-traffic engineering RSVP-TE-based Path message sent by an ingress node; determining, by the egress node, whether identification information of a TE LSP and owner-related information corresponding to the TE LSP are stored; and if it is determined that the identification information of the TE LSP and the owner-related information corresponding to the TE LSP are not stored, storing, by the egress node, a correspondence between the identification information of the TE LSP and the owner-related information, and sending an RSVP-TE-based resource reservation Resv message to the ingress node. The present application is applicable to the field of communications.

9 Claims, 5 Drawing Sheets

(51) Int. Cl.
*H04L 12/723* (2013.01)
*H04L 12/913* (2013.01)
*H04L 12/46* (2006.01)

(52) U.S. Cl.
CPC .......... *H04L 45/507* (2013.01); *H04L 47/724* (2013.01); *H04L 2012/4629* (2013.01)

(58) Field of Classification Search
USPC .................................. 370/230–400; 709/223
See application file for complete search history.

(56) References Cited

U.S. PATENT DOCUMENTS

| | | | |
|---|---|---|---|
| 2012/0151030 A1* | 6/2012 | Guttman | H04L 45/24 709/223 |
| 2012/0155327 A1 | 6/2012 | Fondelli et al. | |
| 2013/0100953 A1 | 4/2013 | Li et al. | |
| 2013/0336159 A1* | 12/2013 | Previdi | H04L 45/50 370/254 |

FOREIGN PATENT DOCUMENTS

| | | |
|---|---|---|
| CN | 102487351 | 6/2012 |
| CN | 103384220 | 11/2013 |
| EP | 1 942 606 A1 | 7/2008 |
| WO | 2008/125144 A1 | 10/2008 |

OTHER PUBLICATIONS

Chinese Office Action dated Dec. 1, 2016 in corresponding Chinese Patent Application No. 201310270622.1.
Berger, "Generalized Multi-Protocol Label Switching (GMPLS) Signaling Functional Description", Network Working Group, Movaz Networks, Jan. 2003, pp. 1-34.
Berger, "Generalized Multi-Protocol Label Switching (GMPLS) Signaling Resourse ReserVation Protocol-Traffic Engineering (RSVP-TE) Extensions", Network Working Group, Movaz Networks, Jan. 2003, pp. 1-42.
International Search Report dated Sep. 26, 2014 in corresponding International Application No. PCT/CN2014/081064.
Chinese Office Action dated Oct. 30, 2015 in corresponding Chinese Patent Application No. 201310270622.1.
PCT International Search Report dated Sep. 26, 2014 in corresponding International Patent Application No. PCT/CN2014/081064.
Wushiyang, "RSVP signaling extension for MPLS traffic engineering", ChinaUnix, Mar. 27, 2010, pp. 1-18.
Kumaki et al., "Support for Resource Reservation Protocol Traffic Engineering (RSVP-TE) in Layer 3 Virtual Private Networks (L3VPNs)", Internet Engineering Task Force (IETF), Mar. 2013, pp. 1-15.

* cited by examiner

METHOD, DEVICE, AND SYSTEM FOR ESTABLISHING TRAFFIC ENGINEERING LABEL SWITCHED PATH

CROSS-REFERENCE TO RELATED APPLICATIONS

This application is a continuation of International Application No. PCT/CN2014/081064, filed on Jun. 28, 2014, which claims priority to Chinese Patent Application No. 201310270622.1, filed on Jun. 28, 2013, both of which are hereby incorporated by reference in their entireties.

TECHNICAL FIELD

This application relates to the field of communications, and in particular, to a method, a device, and a system for establishing a traffic engineering label switched path.

BACKGROUND

A Multi-Protocol Label Switching Traffic Engineering (MPLS-TE) technology can provide reliable bandwidth assurance for a network, which improves service quality of a network and ensures that a service level agreement (SLA) satisfies the requirement. Therefore, the MPLS-TE technology is widely applied to an existing network.

The Resource Reservation Protocol-Traffic Engineering (RSVP-TE) is a signaling protocol for implementing MPLS-TE. The RSVP-TE defines a path (Path) message, a resource reservation (Resv) message, and other messages, and an object/subobject (Object/Subobject) mechanism. The RSVP-TE implements, by adding an Object/Subobject to the Path or Resv message exchanged between nodes that a traffic engineering (TE) path passed through, various parameters and constraint conditions required by a TE label switched path (LSP), to implement establishment of the TE LSP.

In actual network operation of an operator, one or more dedicated TE LSPs often need to be established for a specific tenant or service, and these TE LSPs can only be used by the specific tenant or service.

Conventionally, after one TE LSP is established, tenant or service related attributes may be configured on an ingress node and an egress node of the TE LSP, or tenant or service related attributes may be configured by using a network management system (Network Management System, NMS). In such a method for configuring tenant or service related attributes for a TE LSP, tenant or service related attributes are configured for each TE LSP after a TE LSP is established. In this way, in a large-scale networking scenario, tenant or service related attributes need to be configured for a large quantity of TE LSPs, which is error-prone. Therefore, the method is inapplicable to the scenario of large-scale networking.

Conventionally, a tenant or a service may further be used to directly drive establishment of a TE LSP, and the tenant or the service is bound to the TE LSP. In this method of configuring tenant or service related attributes for the TE LSP, after being formed, a binding relationship between a tenant or a service and the TE LSP is difficult to change, and cannot meet a scenario of dynamical adjustment; moreover, the TE LSP has no tenant or service related information, and is difficult to implement filtering and management based on the tenant or the service.

SUMMARY

Embodiments of the present invention provide a method, a device, and a system for establishing a TE LSP, which can establish a dedicated TE LSP for a specific tenant or service, so as to implement effective isolation between tenants or between services and ensure security of tenant topology information or service topology information, and are applicable to a large-scale networking scenario.

In order to achieve the foregoing objectives, the embodiments of the present invention use the following technical solutions:

According to a first aspect, a method for establishing a TE LSP is provided, where the method includes:

receiving, by an egress node, an RSVP-TE-based Path message sent by an ingress node, where the Path message includes owner-related information of a to-be-established TE LSP and identification information of the TE LSP, and the owner includes at least one of a tenant and a service;

determining, by the egress node, whether the identification information of the TE LSP and the owner-related information corresponding to the TE LSP are stored; and if it is determined that the identification information of the TE LSP and the owner-related information corresponding to the TE LSP are not stored, storing, by the egress node, a correspondence between the identification information of the TE LSP and the owner-related information, and sending an RSVP-TE-based Resv message to the ingress node, so as to establish the TE LSP from the ingress node to the egress node, where the Resv message includes the owner-related information.

According to the first aspect, in a first possible implementation manner of the first aspect, the method further includes:

if it is determined that the identification information of the TE LSP and the owner-related information corresponding to the TE LSP are stored, determining, by the egress node, whether the owner-related information matches locally stored owner-related information corresponding to the identification information of the TE LSP; and if it is determined that the owner-related information matches the locally stored owner-related information corresponding to the identification information of the TE LSP, sending, by the egress node, the Resv message to the ingress node.

According to the first aspect or the first possible implementation manner of the first aspect, in a second possible implementation manner of the first aspect, that the Path message includes owner-related information of a to-be-established TE LSP specifically includes that:

the Path message includes a label switched path attribute object (LSP_ATTRIBUTE Object) of the to-be-established TE LSP, where the LSP_ATTRIBUTE Object includes the owner-related information; or, the Path message includes a session attribute object (SESSION_ATTRIBUTE Object) of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

According to a second aspect, a method for establishing a TE LSP is provided, where the method includes:

generating, by an ingress node, an RSVP-TE-based Path message, where the Path message includes owner-related information of a to-be-established TE LSP and identification information of the TE LSP, and the owner includes at least one of a tenant and a service;

sending, by the ingress node, the Path message to an egress node, where the Path message is used for determining, by the egress node, whether the identification information of the TE LSP and the owner-related information corresponding to the TE LSP are stored; and receiving, by the ingress node, an RSVP-TE-based Resv message sent by the egress node, to establish the TE LSP from the ingress node to the egress node.

According to the second aspect, in a first possible implementation manner of the second aspect, the Resv message is sent when the ingress node determines that related information of the tenant or the service is not stored; or, the Resv message is sent when the egress node determines, after the egress node determines that the identification information of the TE LSP and the owner-related information corresponding to the TE LSP are stored, that the owner-related information matches locally stored owner-related information corresponding to the identification information of the TE LSP.

According to the second aspect or the first possible implementation manner of the second aspect, in a second possible implementation manner of the second aspect, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

According to a third aspect, an egress node device is provided, where the egress node device includes: a receiving unit, a determining unit, and a processing unit, where the receiving unit is configured to receive an RSVP-TE-based Path message sent by an ingress node device, where the Path message includes owner-related information of a to-be-established TE LSP and identification information of the TE LSP, and the owner includes at least one of a tenant and a service;

the determining unit is configured to determine whether the identification information of the TE LSP and the owner-related information corresponding to the TE LSP are stored; and the processing unit is configured to: if the determining unit determines that the identification information of the TE LSP and the owner-related information corresponding to the TE LSP are not stored, store a correspondence between the identification information of the TE LSP and the owner-related information, and send an RSVP-TE-based Resv message to the ingress node device, so as to establish the TE LSP from the ingress node device to the egress node device, where the Resv message includes the owner-related information.

According to the third aspect, in a first possible implementation manner of the third aspect, the egress node device further includes: a judging unit and a sending unit, where the judging unit is configured to: if the determining unit determines that the identification information of the TE LSP and the owner-related information corresponding to the TE LSP are stored, determine whether the owner-related information matches locally stored owner-related information corresponding to the identification information of the TE LSP; and the sending unit is configured to: if the judging unit determines that the owner-related information matches the locally stored owner-related information corresponding to the identification information of the TE LSP, send the Resv message to the ingress node device.

According to the third aspect or the first possible implementation manner of the third aspect, in a second possible implementation manner of the third aspect, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

According to a fourth aspect, an ingress node device is provided, where the ingress node device includes: a generating unit, a sending unit, a receiving unit, and an establishing unit, where the generating unit is configured to generate an RSVP-TE-based Path message, where the Path message includes owner-related information of a to-be-established TE LSP and identification information of the TE LSP, and the owner includes at least one of a tenant and a service;

the sending unit is configured to send the Path message to an egress node device, where the Path message is used for determining, by the egress node device, whether the identification information of the TE LSP and the owner-related information corresponding to the TE LSP are stored;

the receiving unit is configured to receive an RSVP-TE-based Resv message sent by the egress node device; and the establishing unit is configured to establish the TE LSP from the ingress node device to the egress node device according to the Resv message.

According to the fourth aspect, in a first possible implementation manner of the fourth aspect, the Resv message is sent when the egress node device determines that related information of the tenant or the service is not stored; or, the Resv message is sent when the egress node device determines, after the egress node device determines that the identification information of the TE LSP and the owner-related information corresponding to the TE LSP are stored, that the owner-related information matches locally stored owner-related information corresponding to the identification information of the TE LSP.

According to the fourth aspect or the first possible implementation manner of the fourth aspect, in a second possible implementation manner of the fourth aspect, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

According to a fifth aspect, a system for establishing a TE LSP is provided, where the system includes an egress node device and an ingress node device, where the ingress node device is configured to send an RSVP-TE-based Path message to the egress node device, where the Path message includes owner-related information of a to-be-established TE LSP and identification information of the TE LSP, and the owner includes at least one of a tenant and a service;

the egress node device is configured to receive the Path message sent by the ingress node device, determine whether the identification information of the TE LSP and the owner-related information corresponding to the TE LSP are stored, and when it is determined that the identification information of the TE LSP and the owner-related information corresponding to the TE LSP are not stored, send a Resv message to the ingress node device; and the ingress node device is further configured to receive the Resv message sent by the egress node device, to establish the TE LSP according to the Resv message.

According to the method, the device, and the system for establishing a TE LSP in the embodiments of the present invention, an egress node receives an RSVP-TE-based Path message sent by an ingress node, where the Path message includes owner-related information of a to-be-established TE LSP and identification information of the TE LSP, and the owner includes at least one of a tenant and a service; the egress node determines whether the identification information of the TE LSP and the owner-related information corresponding to the TE LSP are stored; and if it is determined that the identification information of the TE LSP and the owner-related information corresponding to the TE LSP are not stored, the egress node stores a correspondence between the identification information of the TE LSP and the owner-related information, and sends an RSVP-TE-based Resv message to the ingress node, so as to establish the TE LSP from the ingress node device to the egress node device, where the Resv message includes the owner-related information.

According to the solutions, the owner-related information of the TE LSP is carried in a Path message, and when one TE LSP is being established, related owner-related information is configured for the TE LSP, so that a dedicated TE LSP can be established for a specific tenant or service; an egress node can determine, according to a locally stored correspondence between a TE LSP and owner-related information of the TE LSP, whether an accessed tenant or service is legal, so as to implement effective isolation between tenants or between services, and ensure security of tenant topology information or service topology information, and the solutions are applicable to a large-scale networking scenario.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
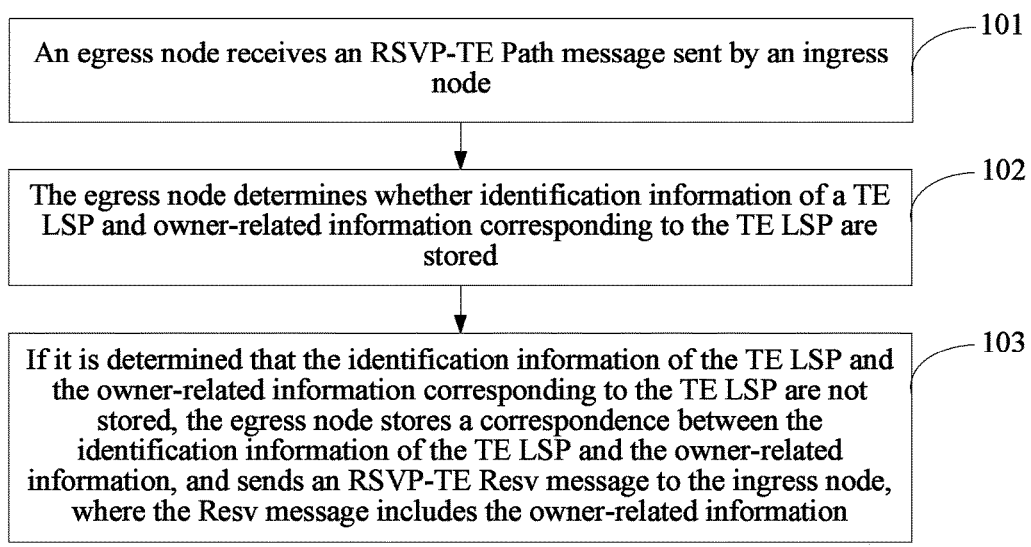
FIG. 1 is a schematic flowchart of a method for establishing a TE LSP according to an embodiment of the present invention.

Referring to FIG. 1, an embodiment of the present invention provides a method for establishing a TE LSP, and the method is executed by an egress node. The method includes:

101: An egress node receives an RSVP-TE-based Path message sent by an ingress node.

The Path message includes owner-related information of a to-be-established TE LSP and identification information of the TE LSP, and the owner includes at least one of a tenant and a service.

The tenant is a user who leases a network resource; and services are various applications borne on a network, such as a virtual private network (VPN), a video, and the Voice over Internet Protocol (VoIP).

The identification information of the to-be-established TE LSP may be carried in an object of the Path message, for example, the identification information of the to-be-established TE LSP may be included in a SESSION_ATTRIBUTE Object.

102: The egress node determines whether identification information of a TE LSP and owner-related information corresponding to the TE LSP are stored.

The egress node stores a correspondence between the identification information of the TE LSP and the owner-related information of the TE LSP.

Specifically, the egress node may determine whether an egress node device stores the identification information of the TE LSP and the owner-related information corresponding to the TE LSP.

103: If it is determined that the identification information of the TE LSP and the owner-related information corresponding to the TE LSP are not stored, the egress node stores a correspondence between the identification information of the TE LSP and the owner-related information, and sends an RSVP-TE-based Resv message to the ingress node, where the Resv message includes the owner-related information.

When it is determined that the egress node device does not store the identification information of the TE LSP and the owner-related information corresponding to the TE LSP, the egress node stores the correspondence between the identification information of the TE LSP and the owner-related information, and generates a Resv message according to the correspondence between the identification information of the TE LSP and the owner-related information. Then, the egress node sends the Resv message to the ingress node by using an intermediate node.

When the egress node sends the Resv message to the ingress node by using the intermediate node, after the ingress node receives the Resv message, the TE LSP is established successfully.

According to the method for establishing a TE LSP provided in this embodiment of the present invention, an egress node receives an RSVP-TE-based Path message sent by an ingress node, where the Path message includes owner-related information of a to-be-established TE LSP and identification information of the TE LSP, and the owner includes at least one of a tenant and a service; the egress node determines whether the identification information of the TE LSP and the owner-related information corresponding to the TE LSP are stored; and if it is determined that the identification information of the TE LSP and the owner-related information corresponding to the TE LSP are not stored, the egress node stores a correspondence between the identification information of the TE LSP and the owner-related information, and sends an RSVP-TE-based Resv message to the ingress node, so as to establish the TE LSP from the ingress node device to the egress node device, where the Resv message includes the owner-related information.

According to this solution, the owner-related information of the TE LSP is carried in the Path message, and when one TE LSP is being established, related owner-related information is configured for the TE LSP, so that a dedicated TE LSP can be established for a specific tenant or service; an egress node can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 2:
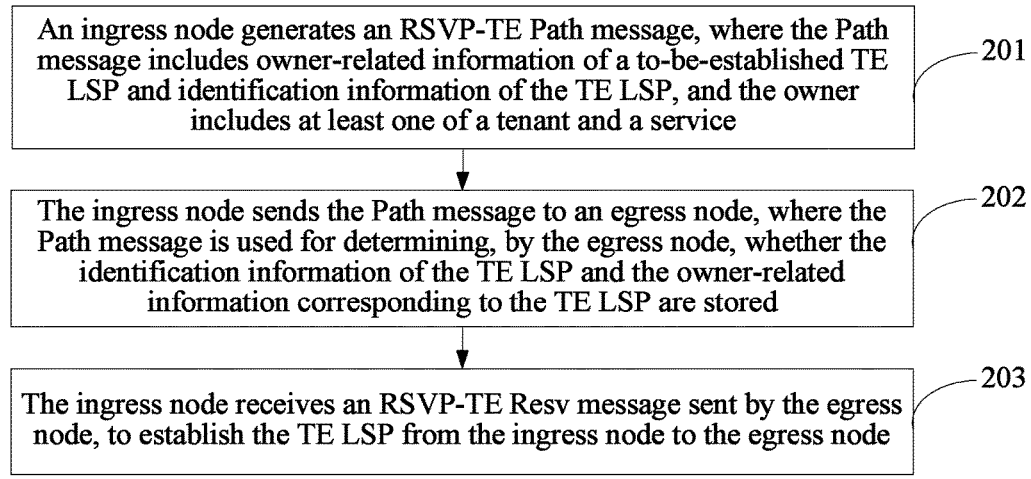
FIG. 2 is a schematic flowchart of another method for establishing a TE LSP according to an embodiment of the present invention.

Referring to FIG. 2, an embodiment of the present invention provides a method for establishing a TE LSP, and the method is executed by an ingress node. The method includes:

201: An ingress node generates an RSVP-TE-based Path message, where the Path message includes owner-related information of a to-be-established TE LSP and identification information of the TE LSP, and the owner includes at least one of a tenant and a service.

Specifically, when generating the Path message, the ingress node carries owner-related information of the to-be-established TE LSP.

202: The ingress node sends the Path message to an egress node, where the Path message is used for determining, by the egress node, whether the identification information of the TE LSP and the owner-related information corresponding to the TE LSP are stored.

Specifically, the ingress node sends the Path message to the egress node by using an intermediate node. After receiving the Path message, the egress node determines whether the identification information of the TE LSP and the owner-related information corresponding to the TE LSP are stored.

203: The ingress node receives an RSVP-TE-based Resv message sent by the egress node, to establish the TE LSP from the ingress node to the egress node.

Specifically, after receiving the Path message, the egress node determines whether the identification information of the TE LSP and the owner-related information corresponding to the TE LSP are stored. If it is determined that the identification information of the TE LSP and the owner-related information corresponding to the TE LSP are not stored, the egress node stores a correspondence between the identification information of the TE LSP and the owner-related information, and sends the RSVP-TE-based Resv message to the ingress node, where the Resv message includes the owner-related information. If it is determined that the identification information of the TE LSP and the owner-related information corresponding to the TE LSP are stored, the egress node determines whether the owner-related information matches locally stored owner-related information corresponding to the identification information of the TE LSP. If it is determined that the owner-related information matches the locally stored owner-related information corresponding to the identification information of the TE LSP, the egress node sends the Resv message to the ingress node.

The Resv message is sent when the egress node determines that related information of the tenant and the service is not stored; or, the Resv message is sent when the egress node determines, after the egress node determines that the identification information of the TE LSP and the owner-related information corresponding to the TE LSP are stored, that the owner-related information matches the locally stored owner-related information corresponding to the identification information of the TE LSP.

According to the method for establishing a TE LSP provided in this embodiment of the present invention, an ingress node generates an RSVP-TE-based Path message, where the Path message includes owner-related information of a to-be-established TE LSP and identification information of the TE LSP; the ingress node sends the Path message to the egress node, where the Path message is used for determining, by the egress node, whether the identification information of the TE LSP and the owner-related information corresponding to the TE LSP are stored; and the ingress node receives an RSVP-TE-based Resv message sent by the egress node, and establishes the TE LSP from the ingress node to the egress node.

According to this solution, the owner-related information of the TE LSP is carried in the Path message, and when one TE LSP is being established, related owner-related information is configured for the TE LSP, so that a dedicated TE LSP can be established for a specific tenant or service; an egress node can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 3:
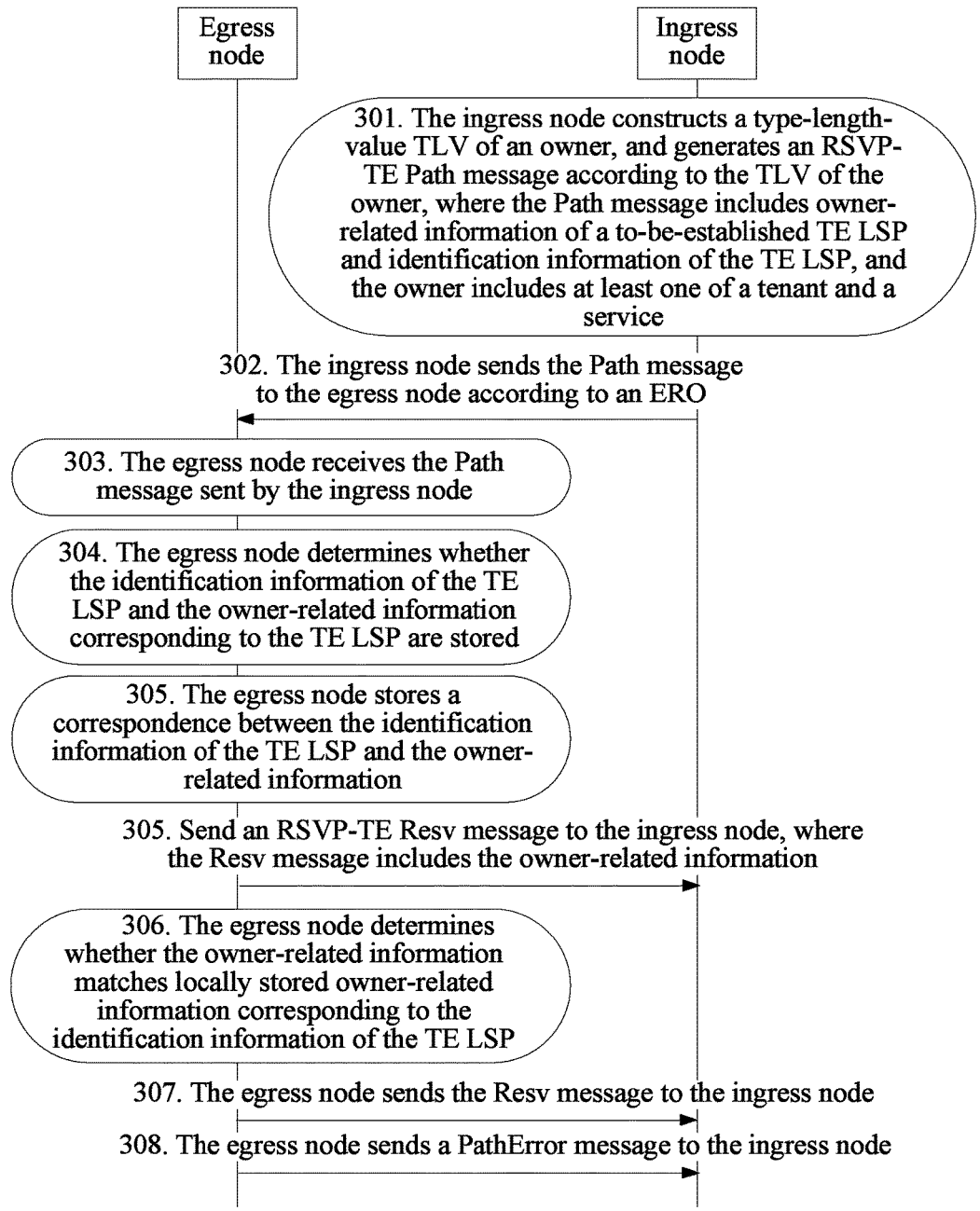
FIG. 3 is a schematic interaction diagram of a method for establishing a TE LSP according to an embodiment of the present invention.

Referring to FIG. 3, an embodiment of the present invention provides a method for establishing a TE LSP. The method includes:

301: An ingress node constructs a type-length-value TLV of an owner, and generates an RSVP-TE-based Path message according to the TLV of the owner, where the Path message includes owner-related information of a to-be-established TE LSP and identification information of the TE LSP, and the owner includes at least one of a tenant and a service.

The type-length-value (TLV) of the owner includes the owner-related information.

Specifically, when generating the Path message, the ingress node carries the TLV of the owner and an explicit route object (Explicit Route Object, ERO).

An ERO is an object defined in an RSVP-TE. An ERO is generally carried in the Path message, and is used for carrying constraint of the TE LSP, such as nodes, ports, and the like by which the TE LSP needs to pass.

It should be noted that, TLV encoding is used for indicating a type (T) of transmitted information, a length (L) of to-be-transmitted information, and a value (V) of transmitted actual information. A length (L) parameter included in a length field is generally specific to an implementation manner, and may indicate a length from beginning to ending of a type field of an object. However, a length usually indicates a length of a value (V) field instead of a length of a type (T) field or a length of a length (L) field.

302: The ingress node sends the Path message to an egress node according to an ERO.

The ingress node sends the Path message to an intermediate node according to a path indicated by the ERO, and the intermediate node does not process the owner-related information and directly forwards the owner-related information to a next intermediate node without modification, until the Path message reaches the egress node.

The Path message may include an LSP_ATTRIBUTE Object of the to-be-established TE LSP, and the LSP_ATTRIBUTE Object includes the owner-related information; or, the Path message includes a SESSION_ATTRIBUTE Object of the to-be-established TE LSP, and the SESSION_ATTRIBUTE Object includes the owner-related information; or, the Path message includes an owner object or an owner subobject of the to-be-established TE LSP, the owner object or the owner subobject includes the owner-related information, and the owner object or the owner subobject is a newly defined RSVP-TE-based object.

Certainly, another object or subobject may also be defined in an RSVP-TE protocol included in the Path message, and the another object or subobject includes the owner-related information.

It should be noted that, the owner-related information is specifically: a type-length-value TLV of at least one of the tenant or the service.

303: The egress node receives the Path message sent by the ingress node.

304: The egress node determines whether the identification information of the TE LSP and the owner-related information corresponding to the TE LSP are stored.

If it is determined that the identification information of the TE LSP and the owner-related information corresponding to the TE LSP are not stored, step 305 is performed; and if it is determined that the identification information of the TE LSP and the owner-related information corresponding to the TE LSP are stored, step 306 is performed.

305: The egress node stores a correspondence between the identification information of the TE LSP and the owner-related information, and sends an RSVP-TE-based Resv message to the ingress node, where the Resv message includes the owner-related information.

Specifically, the egress node stores the correspondence between the identification information of the TE LSP and the owner-related information into a memory. The egress node adds the owner-related information to an object same as an object in the received Path message sent by the ingress node, and sends the Resv message to the ingress node.

For example, in the Path message, the owner-related information is included in the LSP_ATTRIBUTE Object, and in the Resv message, the owner-related information is also included in the LSP_ATTRIBUTE Object.

After the ingress node receives the Resv message sent by the egress node, the TE LSP is established successfully.

306: The egress node determines whether the owner-related information matches locally stored owner-related information corresponding to the identification information of the TE LSP.

If it is determined that the owner-related information matches the locally stored owner-related information corresponding to the identification information of the TE LSP, step 307 is performed; and if it is determined that the owner-related information does not match the locally stored owner-related information corresponding to the identification information of the TE LSP, step 308 is performed.

307: The egress node sends the Resv message to the ingress node.

The Resv message carries the owner-related information.

Specifically, the egress node adds the owner-related information to an object same as the object in the received Path message sent by the ingress node, and sends the Resv message to the ingress node.

After the ingress node receives the Resv message sent by the egress node, the TE LSP is established successfully.

308: The egress node sends a PathError message to the ingress node.

The PathError message is a message defined in the RSVP-TE protocol, and is used for reporting, by the egress node to the ingress node, that the Path message has an error, and a related TE LSP cannot be established.

The egress node sends the PathError message to the ingress node, and establishment of the TE LSP fails.

According to the method for establishing a TE LSP provided in this embodiment of the present invention, an egress node receives an RSVP-TE-based Path message sent by an ingress node, where the Path message includes owner-related information of a to-be-established TE LSP and identification information of the TE LSP, and the owner includes at least one of a tenant and a service; the egress node determines whether the identification information of the TE LSP and the owner-related information corresponding to the TE LSP are stored; and if it is determined that the identification information of the TE LSP and the owner-related information corresponding to the TE LSP are not stored, the egress node stores a correspondence between the identification information of the TE LSP and the owner-related information, and sends an RSVP-TE-based Resv message to the ingress node, so as to establish the TE LSP from the ingress node device to the egress node device, where the Resv message includes the owner-related information.

According to this solution, the owner-related information of the TE LSP is carried in the Path message, and when one TE LSP is being established, related owner-related information is configured for the TE LSP, so that a dedicated TE LSP can be established for a specific tenant or service; an egress node can determine, according to a locally stored correspondence between a TE LSP and owner-related information of the TE LSP, whether an accessed tenant or service is legal, so as to implements effective isolation between tenants or between services, and ensures security of tenant topology information or service topology information, and this solution is applicable to a large-scale networking scenario.

Figure 4:
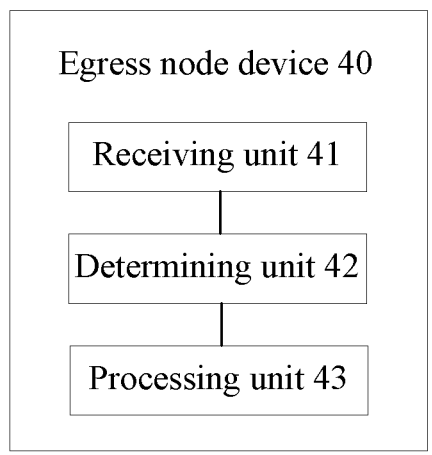
FIG. 4 is a schematic structural diagram of an egress node device according to an embodiment of the present invention.

Referring to FIG. 4, an embodiment of the present invention provides an egress node device, where the egress node device 40 includes: a receiving unit 41, a determining unit 42, and a processing unit 43.

The receiving unit 41 is configured to receive an RSVP-TE-based Path message sent by an ingress node device, where the Path message includes owner-related information of a to-be-established TE LSP and identification information of the TE LSP, and the owner includes at least one of a tenant and a service.

The determining unit 42 is configured to determine whether the identification information of the TE LSP and the owner-related information corresponding to the TE LSP are stored.

The processing unit 43 is configured to: if the determining unit 42 determines that the identification information of the TE LSP and the owner-related information corresponding to the TE LSP are not stored, store a correspondence between the identification information of the TE LSP and the owner-related information, and send an RSVP-TE-based Resv message to the ingress node device, so as to establish the TE LSP from the ingress node device to the egress node device, where the Resv message includes the owner-related information.

Figure 5:
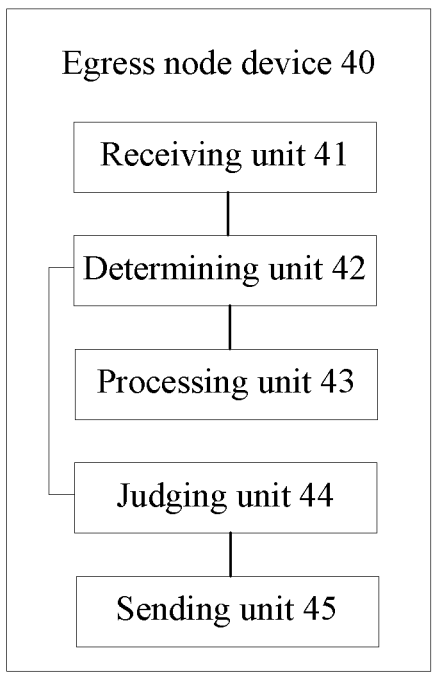
FIG. 5 is a schematic structural diagram of another egress node device according to an embodiment of the present invention.

Referring to FIG. 5, the egress node device 40 further includes: a judging unit 44 and a sending unit 45.

The judging unit 44 is configured to: if the determining unit 42 determines that the identification information of the TE LSP and the owner-related information corresponding to the TE LSP are stored, determine whether the owner-related information matches locally stored owner-related information corresponding to the identification information of the TE LSP.

The sending unit 45 is configured to: if the judging unit 44 determines that the owner-related information matches the locally stored owner-related information corresponding to the identification information of the TE LSP, send the Resv message to the ingress node device.

Further, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

Optionally, the egress node device 40 may perform the method for establishing a TE LSP shown in FIG. 1.

According to the egress node provided in this embodiment of the present invention, the receiving unit receives an RSVP-TE-based Path message sent by an ingress node device, where the Path message includes owner-related information of a to-be-established TE LSP and identification information of the TE LSP, and the owner includes at least one of a tenant and a service; the determining unit determines whether the identification information of the TE LSP and the owner-related information corresponding to the TE LSP are stored; and if it is determined that the identification information of the TE LSP and the owner-related information corresponding to the TE LSP are not stored, the processing unit stores a correspondence between the identification information of the TE LSP and the owner-related information, and sends an RSVP-TE-based Resv message to the ingress node device, so as to establish the TE LSP from the ingress node device to the egress node device, where the Resv message includes the owner-related information.

According to this solution, the owner-related information of the TE LSP is carried in the Path message, and when one TE LSP is being established, related owner-related information is configured for the TE LSP, so that a dedicated TE LSP can be established for a specific tenant or service; an egress node device can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 6:
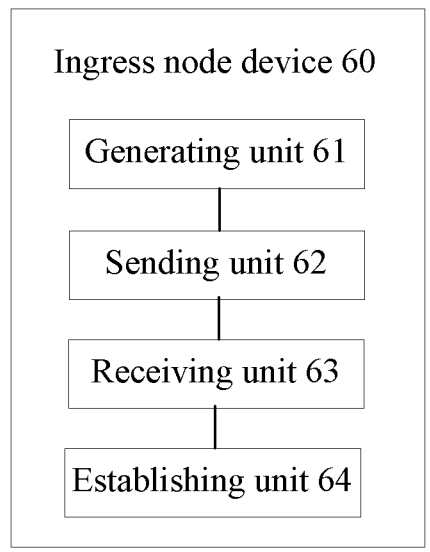
FIG. 6 is a schematic structural diagram of an ingress node device according to an embodiment of the present invention.

Referring to FIG. 6, an embodiment of the present invention provides an ingress node device, where the ingress node device 60 includes: a generating unit 61, a sending unit 62, a receiving unit 63, and an establishing unit 64.

The generating unit 61 is configured to generate an RSVP-TE-based Path message, where the Path message includes owner-related information of a to-be-established TE LSP and identification information of the TE LSP, and the owner includes at least one of a tenant and a service.

The sending unit 62 is configured to send the Path message to an egress node device, where the Path message is used for determining, by the egress node device, whether the identification information of the TE LSP and the owner-related information corresponding to the TE LSP are stored.

The receiving unit 63 is configured to receive an RSVP-TE-based Resv message sent by the egress node device.

The establishing unit 64 is configured to establish the TE LSP from the ingress node device to the egress node device according to the Resv message.

Further, the Resv message is sent when the egress node device determines that related information of the tenant or the service is not stored; or, the Resv message is sent when the egress node device determines, after the egress node device determines that the identification information of the TE LSP and the owner-related information corresponding to the TE LSP are stored, that the owner-related information matches locally stored owner-related information corresponding to the identification information of the TE LSP.

Further, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

Optionally, the ingress node device 60 may perform the method for establishing a TE LSP shown in FIG. 2.

According to the ingress node device provided in this embodiment of the present invention, the generating unit generates an RSVP-TE-based Path message, where the Path message includes owner-related information of a to-be-established TE LSP and identification information of the TE LSP; the sending unit sends the Path message to an egress node device, where the Path message is used for determining, by the egress node device, whether the identification information of the TE LSP and the owner-related information corresponding to the TE LSP are stored; the receiving unit receives an RSVP-TE-based Resv message sent by the egress node device; and the establishing unit establishes the TE LSP from the ingress node device to the egress node device according to the Resv message.

According to this solution, the owner-related information of the TE LSP is carried in the Path message, and when one TE LSP is being established, related owner-related information is configured for the TE LSP, so that a dedicated TE LSP can be established for a specific tenant or service; an egress node device can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 7:
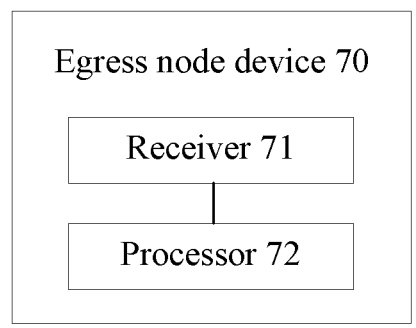
FIG. 7 is a schematic structural diagram of still another egress node device according to an embodiment of the present invention.

Referring to FIG. 7, an embodiment of the present invention provides an egress node device, where the egress node device 70 includes: a receiver 71 and a processor 72.

The receiver 71 is configured to receive an RSVP-TE-based Path message sent by an ingress node device, where the Path message includes owner-related information of a to-be-established TE LSP and identification information of the TE LSP, and the owner includes at least one of a tenant and a service.

The processor 72 is configured to determine whether the identification information of the TE LSP and the owner-related information corresponding to the TE LSP are stored.

The processor 72 is further configured to: if the processor 72 determines that the identification information of the TE LSP and the owner-related information corresponding to the TE LSP are not stored, store a correspondence between the identification information of the TE LSP and the owner-related information, and send an RSVP-TE-based Resv message to the ingress node device, so as to establish the TE LSP from the ingress node device to the egress node device, where the Resv message includes the owner-related information.

Further, the processor 72 is further configured to: if the processor 72 determines that the identification information of the TE LSP and the owner-related information corresponding to the TE LSP are stored, determine whether the owner-related information matches locally stored owner-related information corresponding to the identification information of the TE LSP.

Optionally, the egress node device 70 may perform the method for establishing a TE LSP shown in FIG. 1.

Figure 8:
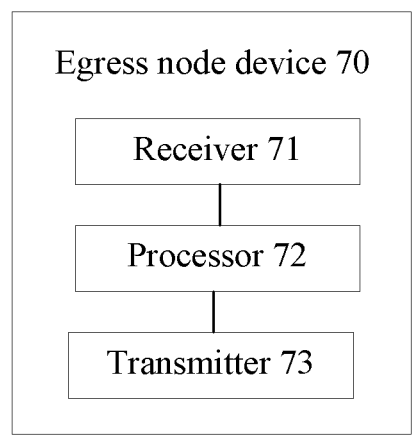
FIG. 8 is a schematic structural diagram of yet another egress node device according to an embodiment of the present invention.

Referring to FIG. 8, the egress node device 70 further includes: a transmitter 73.

The transmitter 73 is configured to: if the processor 72 determines that the owner-related information matches the locally stored owner-related information corresponding to the identification information of the TE LSP, send the Resv message to the ingress node device.

Further, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

According to the egress node provided in this embodiment of the present invention, the receiver receives an RSVP-TE-based Path message sent by an ingress node device, where the Path message includes owner-related information of a to-be-established TE LSP and identification information of the TE LSP, and the owner includes at least one of a tenant and a service; the processor determines whether the identification information of the TE LSP and the owner-related information corresponding to the TE LSP are stored; and if it is determined that the identification information of the TE LSP and the owner-related information corresponding to the TE LSP are not stored, the processor stores a correspondence between the identification information of the TE LSP and the owner-related information, and sends an RSVP-TE-based Resv message to the ingress node device, where the Resv message includes the owner-related information.

According to this solution, the owner-related information of the TE LSP is carried in the Path message, and when one TE LSP is being established, related owner-related information is configured for the TE LSP, so that a dedicated TE LSP can be established for a specific tenant or service; an egress node device can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 9:
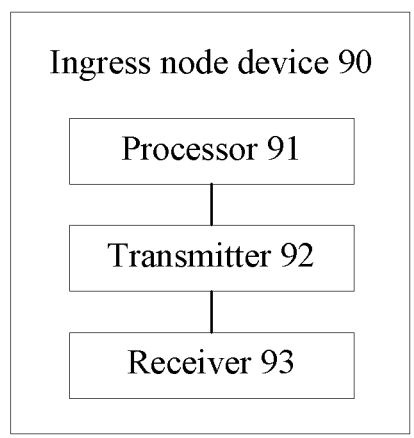
FIG. 9 is a schematic structural diagram of another ingress node device according to an embodiment of the present invention.

Referring to FIG. 9, an embodiment of the present invention provides an ingress node device, where the ingress node device 90 includes: a processor 91, a transmitter 92, and a receiver 93.

The processor 91 is configured to generate an RSVP-TE-based Path message, where the Path message includes owner-related information of a to-be-established TE LSP and identification information of the TE LSP, and the owner includes at least one of a tenant and a service.

The transmitter 92 is configured to send the Path message to an egress node device, where the Path message is used for determining, by the egress node device, whether the identification information of the TE LSP and the owner-related information corresponding to the TE LSP are stored.

The receiver 93 is configured to receive an RSVP-TE-based Resv message sent by the egress node device.

The processor 91 is further configured to establish the TE LSP from the ingress node device to the egress node device according to the Resv message.

Further, the Resv message is sent when the egress node device determines that related information of the tenant or the service is not stored; or, the Resv message is sent when the egress node device determines, after the egress node device determines that the identification information of the TE LSP and the owner-related information corresponding to the TE LSP are stored, that the owner-related information matches locally stored owner-related information corresponding to the identification information of the TE LSP.

Further, that the Path message includes owner-related information of a to-be-established TE LSP specifically includes that:

the Path message includes an LSP_ATTRIBUTE Object of the to-be-established TE LSP, where the LSP_ATTRIBUTE Object includes the owner-related information; or, the Path message includes a SESSION_ATTRIBUTE Object of the to-be-established TE LSP, where the SESSION_ATTRIBUTE Object includes the owner-related information; or, the Path message includes an owner object or an owner subobject of the to-be-established TE LSP, where the owner object or the owner subobject includes the owner-related information, and the owner object or the owner subobject is a newly defined RSVP-TE-based object.

Optionally, the ingress node device 90 may perform the method for establishing a TE LSP shown in FIG. 2.

According to the ingress node device provided in this embodiment of the present invention, the processor generates an RSVP-TE-based Path message, where the Path message includes owner-related information of a to-be-established TE LSP and identification information of the TE LSP; the transmitter sends the Path message to an egress node device, where the Path message is used for determining, by the egress node device, whether the identification information of the TE LSP and the owner-related information corresponding to the TE LSP are stored; the receiver receives an RSVP-TE-based Resv message sent by the egress node device; and the processor establishes the TE LSP from the ingress node device to the egress node device according to the Resv message.

According to this solution, the owner-related information of the TE LSP is carried in the Path message, and when one TE LSP is being established, related owner-related information is configured for the TE LSP, so that a dedicated TE LSP can be established for a specific tenant or service; an egress node device can determine, according to a locally stored correspondence between a TE LSP and owner-related information of the TE LSP, whether an accessed tenant or service is legal, so as to implement effective isolation between tenants or between services, and ensure security of tenant topology information or service topology information, and this solution is applicable to a large-scale networking scenario.

Figure 10:
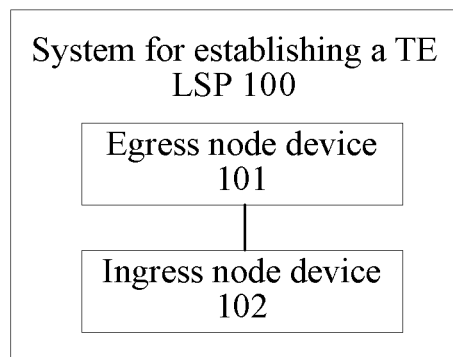
FIG. 10 is a schematic structural diagram of a system for establishing a TE LSP according to an embodiment of the present invention.

Referring to FIG. 10, an embodiment of the present invention provides a system for establishing a TE LSP, where the system 100 specifically includes an egress node device 101 and an ingress node device 102.

The ingress node device 101 is configured to send an RSVP-TE-based Path message to the egress node device, where the Path message includes owner-related information of a to-be-established TE LSP and identification information of the TE LSP, and the owner includes at least one of a tenant and a service.

The egress node device 102 is configured to receive the Path message sent by the ingress node device, determine whether the identification information of the TE LSP and owner-related information corresponding to the TE LSP are stored, and when it is determined that the identification information of the TE LSP and the owner-related information corresponding to the TE LSP are not stored, send a Resv message to the ingress node device.

The ingress node device 101 is further configured to receive the Resv message sent by the egress node device, to establish the TE LSP according to the Resv message.

Optionally, the ingress node 101 may be the ingress node device shown in FIG. 6 or FIG. 9, and the egress node device 102 may be the egress node device shown in FIG. 4, FIG. 5, FIG. 7, or FIG. 8.

According to the system for establishing a TE LSP provided in this embodiment of the present invention, owner-related information of a TE LSP is carried in a Path message, and when one TE LSP is being established, related owner-related information is configured for the TE LSP, so that a dedicated TE LSP can be established for a specific tenant or service; an egress node device can determine, according to a locally stored correspondence between a TE LSP and owner-related information of the TE LSP, whether an accessed tenant or service is legal, so as to implement effective isolation between tenants or between services, and ensure security of tenant topology information or service topology information, and the system is applicable to a large-scale networking scenario.

It may be clearly understood by a person skilled in the art that, for the purpose of convenient and brief description, division of the foregoing functional modules is taken as an example for illustration. In an actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a traffic engineering label switched path (TE LSP), wherein the method comprises:
   receiving, by an egress node, a resource reservation protocol-traffic engineering (RSVP-TE) based Path message sent by an ingress node, wherein the Path message comprises owner-related information of a to-be-established TE LSP and identification information of the TE LSP, and the owner-related information belongs to an owner, the to-be-established TE LSP is established for the owner, and the owner comprises a tenant or a service;
   determining, by the egress node, whether the identification information of the TE LSP and the owner-related information corresponding to the TE LSP are stored; and
   determining, by the egress node, that the identification information of the TE LSP and the owner-related information corresponding to the TE LSP are not stored, and storing, by the egress node, a correspondence between the identification information of the TE LSP and the owner-related information, and sending an RSVP-TE-based resource reservation (Resv) message to the ingress node, so as to establish the TE LSP from the ingress node to the egress node, wherein the Resv message comprises the owner-related information;
   wherein the Path message comprises owner-related information of a to-be-established TE LSP comprises:
   the Path message comprises a label switched path attribute object (LSP ATTRIBUTE Object) of the to-be-established TE LSP, wherein the LSP ATTRIBUTE Object comprises the owner-related information; or,
   the Path message comprises a session attribute object (SESSION ATTRIBUTE Object) of the to-be-established TE LSP, wherein the SESSION ATTRIBUTE Object comprises the owner-related information; or,
   the Path message comprises an owner object or an owner subobject of the to-be-established TE LSP, wherein the owner object or the owner subobject comprises the owner-related information, and the owner object or the owner subobject is a newly defined RSVP-TE-based object.

2. The method according to claim 1, wherein the method further comprises:
   determining, by the egress node, whether the owner-related information matches locally stored owner-related information corresponding to the identification information of the TE LSP, when it is determined that the identification information of the TE LSP and the owner-related information corresponding to the TE LSP are stored; and
   determining that the owner-related information matches the locally stored owner-related information corresponding to the identification information of the TE LSP, and sending, by the egress node, the Resv message to the ingress node.

3. A method for establishing a traffic engineering label switched path (TE LSP), wherein the method comprises:
   generating, by an ingress node, a resource reservation protocol-traffic engineering (RSVP-TE) based Path message, wherein the Path message comprises owner-related information of a to-be-established TE LSP and identification information of the TE LSP, the owner-related information belongs to an owner, the to-be-established TE LSP is established for the owner and the owner comprises a tenant or a service;
   sending, by the ingress node, the Path message to an egress node, wherein the Path message is used for determining, by the egress node, whether the identification information of the TE LSP and the owner-related information corresponding to the TE LSP are stored; and
   receiving, by the ingress node, an RSVP-TE-based resource reservation (Resv) message sent by the egress node, to establish the TE LSP from the ingress node to the egress node;
   wherein the Path message comprises owner-related information of a to-be-established TE LSP comprises:
   the Path message comprises a label switched path attribute object (LSP ATTRIBUTE Object) of the to-be-established TE LSP, wherein the LSP ATTRIBUTE Object comprises the owner-related information; or,
   the Path message comprises a session attribute object (SESSION ATTRIBUTE Object) of the to-be-established TE LSP, wherein the SESSION ATTRIBUTE Object comprises the owner-related information; or,
   the Path message comprises an owner object or an owner subobject of the to-be-established TE LSP, wherein the owner object or the owner subobject comprises the owner-related information, and the owner object or the owner subobject is a newly defined RSVP-TE-based object.

4. The method according to claim 3, wherein the Resv message is sent when the egress node determines that related information of the tenant or the service is not stored; or,
   the Resv message is sent when the egress node determines, after the egress node determines that the identification information of the TE LSP and the owner-related information corresponding to the TE LSP are stored, that the owner-related information matches locally stored owner-related information corresponding to the identification information of the TE LSP.

5. An egress node device, wherein the egress node device comprises: a receiver and a processor, wherein the receiver is configured to:

receive a resource reservation protocol-traffic engineering (RSVP-TE) based Path message sent by an ingress node device, wherein the Path message comprises owner-related information of a to-be-established traffic engineering label switched path (TE LSP) and identification information of the TE LSP, the owner-related information belongs to an owner, the to-be-established TE LSP is established for the owner and the owner comprises a tenant or a service;

the processor is configured to:

determine whether the identification information of the TE LSP and the owner-related information corresponding to the TE LSP are stored, and is configured to: store a correspondence between the identification information of the TE LSP and the owner-related information, and send an RSVP-TE-based resource reservation (Resv) message to the ingress node device, so as to establish the TE LSP from the ingress node device to the egress node device, wherein the Resv message comprises the owner-related information, when the processor determines that the identification information of the TE LSP and the owner-related information corresponding to the TE LSP are not stored;

wherein the Path message comprises owner-related information of a to-be-established TE LSP comprises:

the Path message comprises a label switched path attribute object (LSP ATTRIBUTE Object) of the to-be-established TE LSP, wherein the LSP ATTRIBUTE Object comprises the owner-related information; or, the Path message comprises a session attribute object (SESSION ATTRIBUTE Object) of the to-be-established TE LSP, wherein the SESSION ATTRIBUTE Object comprises the owner-related information; or, the Path message comprises an owner object or an owner subobject of the to-be-established TE LSP, wherein the owner object or the owner subobject comprises the owner-related information, and the owner object or the owner subobject is a newly defined RSVP-TE-based object.

6. The egress node device according to claim 5, wherein the egress node device further comprises: a transmitter, wherein the processor is further configured to:

determine whether the owner-related information matches locally stored owner-related information corresponding to the identification information of the TE LSP, when processor determines that the identification information of the TE LSP and the owner-related information corresponding to the TE LSP are stored; and the transmitter is configured to:

send the Resv message to the ingress node device, when the processor determines that the owner-related information matches the locally stored owner-related information corresponding to the identification information of the TE LSP.

7. An ingress node device, wherein the ingress node device comprises: a processor, a transmitter, and a receiver, wherein the processor is configured to:

generate a resource reservation protocol-traffic engineering (RSVP-TE) based Path message, wherein the Path message comprises owner-related information of a to-be-established traffic engineering label switched path (TE LSP) and identification information of the TE LSP, the owner-related information belongs to an owner, the to-be-established TE LSP is established for the owner and the owner comprises a tenant or a service;

the transmitter is configured to:

send the Path message to an egress node device, wherein the Path message is used for determining, by the egress node device, whether the identification information of the TE LSP and the owner-related information corresponding to the TE LSP are stored;

the receiver is configured to:

receive an RSVP-TE-based resource reservation (Resv) message sent by the egress node device; and the processor is further configured to:

establish the TE LSP from the ingress node device to the egress node device according to the Resv message;

wherein the Path message comprises owner-related information of a to-be-established TE LSP comprises:

the Path message comprises a label switched path attribute object (LSP ATTRIBUTE Object) of the to-be-established TE LSP, wherein the LSP ATTRIBUTE Object comprises the owner-related information; or, the Path message comprises a session attribute object (SESSION ATTRIBUTE Object) of the to-be-established TE LSP, wherein the SESSION ATTRIBUTE Object comprises the owner-related information; or, the Path message comprises an owner object or an owner subobject of the to-be-established TE LSP, wherein the owner object or the owner subobject comprises the owner-related information, and the owner object or the owner subobject is a newly defined RSVP-TE-based object.

8. The ingress node device according to claim 7, wherein the Resv message is sent when the egress node device determines that related information of the tenant or the service is not stored; or, the Resv message is sent when the egress node device determines, after the egress node device determines that the identification information of the TE LSP and the owner-related information corresponding to the TE LSP are stored, that the owner-related information matches locally stored owner-related information corresponding to the identification information of the TE LSP.

9. A system for establishing a traffic engineering label switched path (TE LSP), wherein the system comprises an egress node device and an ingress node device, wherein the ingress node device is configured to:

send a resource reservation protocol-traffic engineering (RSVP-TE) based Path message to the egress node device, wherein the Path message comprises owner-related information of a to-be-established TE LSP and identification information of the TE LSP, the owner-related information belongs to an owner, the to-be-established TE LSP is established for the owner and the owner comprises a tenant or a service;

the egress node device is configured to:

receive the Path message sent by the ingress node device;

determine that the identification information of the TE LSP and the owner-related information corresponding to the TE LSP are not stored; and send a resource reservation (Resv) message to the ingress node device; and the ingress node device is further configured to:

receive the Resv message sent by the egress node device, to establish the TE LSP according to the Resv message;

wherein the Path message comprises owner-related information of a to-be-established TE LSP comprises:

the Path message comprises a label switched path attribute object (LSP ATTRIBUTE Object) of the to-be-established TE LSP, wherein the LSP ATTRIBUTE Object comprises the owner-related information; or, the Path message comprises a session attribute object (SESSION ATTRIBUTE Object) of the to-be-established TE LSP, wherein the SESSION ATTRIBUTE Object comprises the owner-related information; or, the Path message comprises an owner object or an owner subobject of the to-be-established TE LSP, wherein the owner object or the owner subobject comprises the owner-related information, and the owner object or the owner subobject is a newly defined RSVP-TE-based object.

* * * * *